United States Patent
Hilbert et al.

(10) Patent No.: US 7,395,267 B2
(45) Date of Patent: Jul. 1, 2008

(54) SYSTEM AND METHOD FOR CUSTOMIZED DOCUMENT SELECTION

(75) Inventors: David M. Hilbert, Palo Alto, CA (US); Jonathan J. Trevor, Santa Clara, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 486 days.

(21) Appl. No.: 10/777,289

(22) Filed: Feb. 11, 2004

(65) Prior Publication Data
US 2005/0177580 A1 Aug. 11, 2005

(51) Int. Cl.
*G06F 17/30* (2006.01)
(52) U.S. Cl. .................. 707/100; 709/224; 709/225; 709/226
(58) Field of Classification Search ............. 707/9, 707/100, 219, 104; 709/224, 225, 226
See application file for complete search history.

(56) References Cited

U.S. PATENT DOCUMENTS

| | | | | |
|---|---|---|---|---|
| 5,732,219 A | * | 3/1998 | Blumer et al. | 709/227 |
| 5,802,518 A | * | 9/1998 | Karaev et al. | 707/9 |
| 5,864,871 A | * | 1/1999 | Kitain et al. | 707/104.1 |
| 6,144,997 A | | 11/2000 | Lamming et al. | 709/217 |
| 6,362,512 B1 | | 3/2002 | Kubby | |
| 6,379,989 B1 | | 4/2002 | Kubby | |
| 6,772,338 B1 | | 8/2004 | Hull | |
| 6,829,478 B1 | | 12/2004 | Layton et al. | |
| 2002/0038341 A1 | | 3/2002 | Mager et al. | |
| 2002/0112250 A1 | | 8/2002 | Koplar et al. | |
| 2002/0154157 A1 | | 10/2002 | Sherr et al. | |
| 2002/0161860 A1 | * | 10/2002 | Godlin et al. | 709/219 |
| 2003/0023451 A1 | | 1/2003 | Willner et al. | |
| 2003/0088570 A1 | * | 5/2003 | Hilbert et al. | 707/100 |
| 2003/0163740 A1 | * | 8/2003 | Thjai et al. | 713/202 |

OTHER PUBLICATIONS

U.S. Appl. No. 10/777,571, filed Feb. 11, 2004, David M. Hilbert et al.
U.S. Appl. No. 10/790,402, filed Mar. 1, 2004, David M. Hilbert et al.
U.S. Appl. No. 10/828,991, filed Apr. 21, 2001, David M. Hilbert et al.
Cisco Systems, Inc., "Cisco VPN 3000 Series Concentrator," Feb. 5, 2004 (downloaded from http://www.cisco.com/warp/public/779/largeent/learn/technologies/VPNs.html),pp. 1-9.
FileWay, "FileWay™: A Secure, Web Based File Access Solution, " white paper, Oct. 3, 2003 (downloaded from http://www.fileway.com/), 10 pp.

(Continued)

*Primary Examiner*—Hosain Alam
*Assistant Examiner*—Paul Kim
(74) *Attorney, Agent, or Firm*—Fliesler Meyer LLP (57) ABSTRACT

An access server allows secure access to commonly used files stored on multiple file sources from a variety of client devices. The access server stores user identification and password information for each of a variety of file sources. Upon receiving a login request from a user, the access server extracts a list of file sources associated with the user, and accesses each of those sources. The server is then configured to extract a list of most recently used files by the current user as well as information associated with those files. The server presents to the user an interface including links to his most recently used files.

37 Claims, 6 Drawing Sheets

OTHER PUBLICATIONS

Fuji Xerox Co., Ltd., "Fuji Xerox Launches ArcSuite Web-Based Integrated Information Management System," Nov. 26, 2002 (downloaded from http://www.fujixerox.co.jp/eng/headline/2002/1126_arcsuite.html), 3 pp.

FusionOne, "Brew Wireless Internet Application—MightyBackup," Feb. 7, 2004 (downloaded from http://www.fusionone.com), 1 p.

Halpern, Jason, et al., "Safe VPN IPSec Virtual Private Networks in Depth," Cisco Systems, Inc., Sep. 8, 2002 (downloaded from http://www.cisco.com/warp/public/779/largeent/learn/technologies/VPNs.html). pp. 1-96.

InfoStreet, Inc., "Welcome to Infostreet—Deployment Methods," Jan. 29, 2004 (downloaded from http://www.infostreet.com), 1 p.

InfoStreet, Inc., "Welcome to Infostreet—Features—Corporate File Sharing," Jan. 29, 2004 (downloaded from http://www.infostreet.com), 1 p.

InfoStreet, Inc., "Welcome to Infostreet—Solutions—Extranets," Jan. 29, 2004 (downloaded from http://www.infostreet.com), 2 pp.

Microsoft Corporation, "Microsoft Windows 2000 Server—Virtual Private Networking in Windows 2000: An Overview," white paper, Sep. 4, 2001 (downloaded from http://www.microsoft.com/windows2000/technologies/communications/vpn/), pp. i-iii, 1-24.

Motivus, "Motivus Wireless Desktop Server V2.0—Empower Your Wireless Devices," Review Date Jul. 1, 2001, PC Magazine, Ziff Davis Publishing Holdings Inc. (downloaded from http://www.motivus.com), 6 pp.

Nortel Networks, "Mobilizing—Nortel Networks Mobilizing your VPN," Solution Brief, 2004, (downloaded from http://www.nortelnetworks.com/solutions/ip_vpn/), pp. 1-5.

Richardson, Tristan, et al., "Virtual Network Computing," IEEE Internet Computing, vol. 2, No. 1, Jan./Feb. 1998, pp. 33-38.

Trevor, Jonathan, et al., "Issues in Personalizing Shared Ubiquitous Devices," In Proceedings of the 4th International Conference on Ubiquitous Computing (UbiComp 2002), 15 pp.

Xerox Corporation, "Xerox Teams with GoAmerica, Enabling Workers to Travel Light with Enhanced Wireless Software Application," Xerox Newsroom, Apr. 30, 2001, New York, 2 pp.

Xerox Corporation, "the most intuitive way to capture, manage and share documents and content," Xerox DocuShare 3, Sep. 2003, (downloaded from http://www.xerox.com/go/xrx/equipment/product_details.jsp?prodID=DocuShare), 8 pp.

Xythos® Software, Inc., "Simple document and file management—Products, WebFile Client," 2003, Xythos Software Inc., San Francisco, CA, 3 pp.

Citrix Systems, Inc., "GoToMyPC: Making Life Simpler for Remote and Mobile Workers," Citrix Online Division, (downloaded from https://www.gotomypc.com/), pp. 1-7, date unknown.

F5 Networks, Inc., "Secure Remote Access," Datasheet, FirePass® Series, 2004 (downloaded from http://www.uroam.com/), 6 pp., date unknown.

BSCW, "BSCW in practice," www.bscw.de, Dec. 2003, 1 p.

InfoClarus, "Mobile Office Companion Suite," www.infoclarus.com, Dec. 2003, 1 p.

InfoClarus, "ActiveNet Document Companion," www.infoclarus.com, Aug. 2003, 2 pp.

InfoClarus, "ActiveNet File Companion for Web," www.infoclarus.com, Jun. 2003, 3 pp.

InfoClarus, "ActiveNet Internet Mail-File Companion," www.infoclarus.com, Aug. 2002, 3 pp.

InfoClarus, "ActiveNet Conversion Companion," www.infoclarus.com, Jun. 2003, 3 pp.

InfoClarus, "ActiveNet OWA Companion," www.infoclarus.com, Jun. 2003, 3 pp.

Xdrive, Inc., "How it Works," www.xdrive.com, Oct. 2003, 2 pp.

eCopy, Inc., "eCopy Suite," 2 pages (2001).

eCopy, Inc., "eCopy ScanStation and ShareScan Software," 2 pages (Mar. 2001).

eCopy, Inc., "Copiers," 2 pages (2001).

eCopy, Inc., "eCopy Desktop Software (Mailroom)," 2 pages (Mar. 2001).

Lamming, et al., "Satchel: Providing Access to Any Document, Any Time, Anywhere," ACM Transactions on Computer-Human Interaction, vol. 7, No. 3, pp. 322-352 (Sep. 2000).

Mankoff, et al., "Supporting Knowledge Workers Beyond the Desktop with Palplates," CHI '97, pp. 22-27 (Mar. 1997).

Texas Instruments, Inc., "Tag-it-Moving Concepts to Reality," 13 pages (2000).

Xerox Corp., "Xerox Office Software Suite Xerox DocuShare," Version 2.2 SPI, 2 pages (2001).

Richardson, et al., "Teleporting in an X Window System Environment," Olivetti Research Laboratory, 14 pages (Nov. 1993).

Want, et al., "The Active Badge Location System," ACM Transactions on Information Systems, vol. 10, No. 1, pp. 91-102 (Jan. 1992).

Microsoft Corporation, "Microsoft Windows 2000-Based Roaming User Profiles," White Paper, 23 pages (2000).

U.S. Appl. No. 09/467,526, filed Dec. 21, 1999, 30 pages.

* cited by examiner

SYSTEM AND METHOD FOR CUSTOMIZED DOCUMENT SELECTION

FIELD OF THE INVENTION

The current invention relates generally to remote file access and particularly to systems and methods for enabling access to multiple file sources.

BACKGROUND OF THE INVENTION

In the present business environment users are increasingly dependent on access to electronic documents and other files for performing regular business functions. Historically, users stored files upon their local machines and when traveling stored the files on portable media. However, this practice was less than ideal as it did not allow multiple users to simultaneously access the newest version of a file, the size of the physical media limited the types of files that could be used, and the physical media were often unreliable.

As networking technology became more easily accessible, some solutions arose to allow users to access their files away from their home or work computers. Several operating systems enabled users to access files stored on remote networks through internet gateways or TCP/IP enabled file sharing. However, security concerns often limited the usability of such solutions. In order to preserve the vital integrity of the files stored on local networks, such solutions often require users to employ client side Virtual Private Networking (VPN) connections to allow secure access to their remotely stored files. While VPN provides a tolerable level of protection to the remotely stored files, it presents a number of significant difficulties.

Firstly, configuring a client to use VPN requires both administrator level access to the client machine and a lengthy setup procedure. For situations where users wish to access their files from public machines such as those at a retail business center or an internet cafe, this proves to be an intolerable inconvenience. Additionally, many client devices that have entered the market during the past few years such as data-ready cellular phones and Personal Data Assistants (PDA), lack robust support for VPN. Furthermore, VPN typically only allows access to one private network at a time, requiring users that seek to access multiple secure networks to disconnect from the first network before accessing the second network, rather than enjoying simultaneous access to both networks.

Additionally, beyond their restrictions in accessing the raw data sources, VPN and similar remote-access solutions often fail to provide a useful interface for accessing the stored files. Users are forced to wade through complicated file hierarchies to access their preferred files, a task which can be especially cumbersome when using slower devices.

What is needed is a solution that allows users easy and secure access to frequently used files on a variety of file sources.

SUMMARY OF THE INVENTION

An access server allows secure access to commonly used files stored on multiple file sources from a variety of client devices. The access server stores user identification and password information for multiple file sources. The access server is connected to multiple file sources across a Local Area Network (LAN) or Wide Area Network (WAN). Additionally, the server maintains a web gateway for access by client devices.

Upon receiving a login request from a user, the access server extracts a list of file sources associated with the user, and accesses each of those sources. The server contacts each source and submits identification and password information associated with each source.

The server is then configured to extract a list of the most recently used files by the current user as well as information associated with those files. The server presents to the user an interface including links to his most recently used files.

DETAILED DESCRIPTION

Users often store documents such as memos, spreadsheets, and presentations on networked file servers in their homes or offices.

Figure 1:
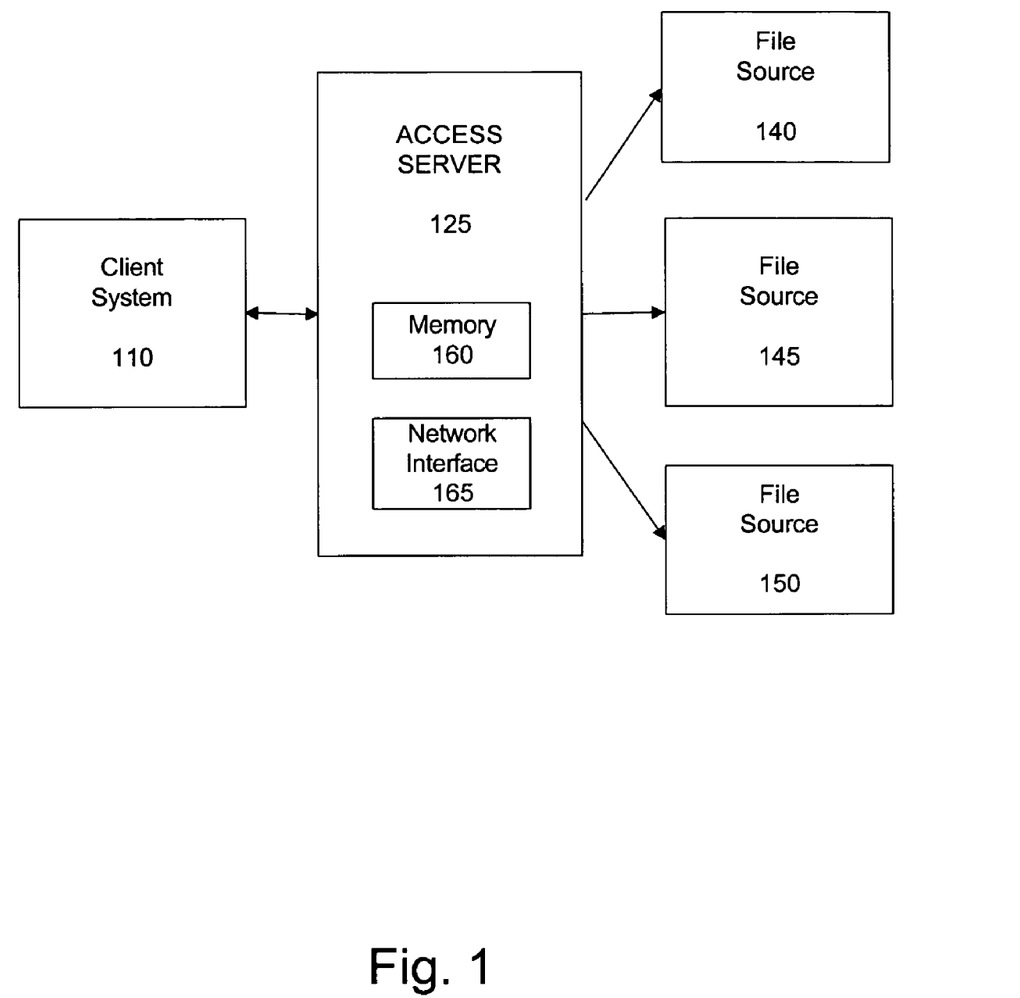
FIG. 1 illustrates the interaction among clients, file sources, and an access server in accordance with one embodiment of the present invention.

FIG. 1 illustrates the interaction among clients, file sources, and an access server in accordance with one embodiment of the present invention. An access server 125 is in communication with a group of file sources 140, 145, 150 and a client system 110. The access server 125 is a server having memory 160, and a network interface 165 that is configured to enable secure access to the file sources 140, 145, 150 from the client system 110.

The file sources 140, 145, 150 are file sources such as stand-alone file servers, desktop computers, laptop computers, or any other system upon which files are stored. The file sources 140, 145, 150 may employ any of a number operating systems, including but not limited to: Windows 2000, Windows XP, Linux, Solaris, Netware, or Linux. The access server 125 accesses the file sources 140, 145, 150 via its network interface 165, through a LAN, WAN, or customized dialup connection. The access server 125 may be located behind whatever firewall protections the file sources may use. Alternately, the access server 125 may use VPN or a customized connection mechanism to reach the file sources 140, 145, 150. The connection mechanism is preferably modular and thus transparent to the client system 110.

The client system 110 is a device remote to the access server 125 used to access, manipulate, print, and/or view the files stored on the file sources 140, 145, 150. The client system 110 can be a personal computer, personal data assistant, or any device having file-viewing capacity. The client system 110 establishes a network connection between itself and the access server 125 and views the files on the file sources 140, 145, 150 through an interface generated by the client or the access server 125. In one embodiment this interface is a web interface. In an alternate embodiment, the access server 125 generates a customized interface according to the viewing capacities of the client system 110, or the client system generates the interface itself.

Figure 2:
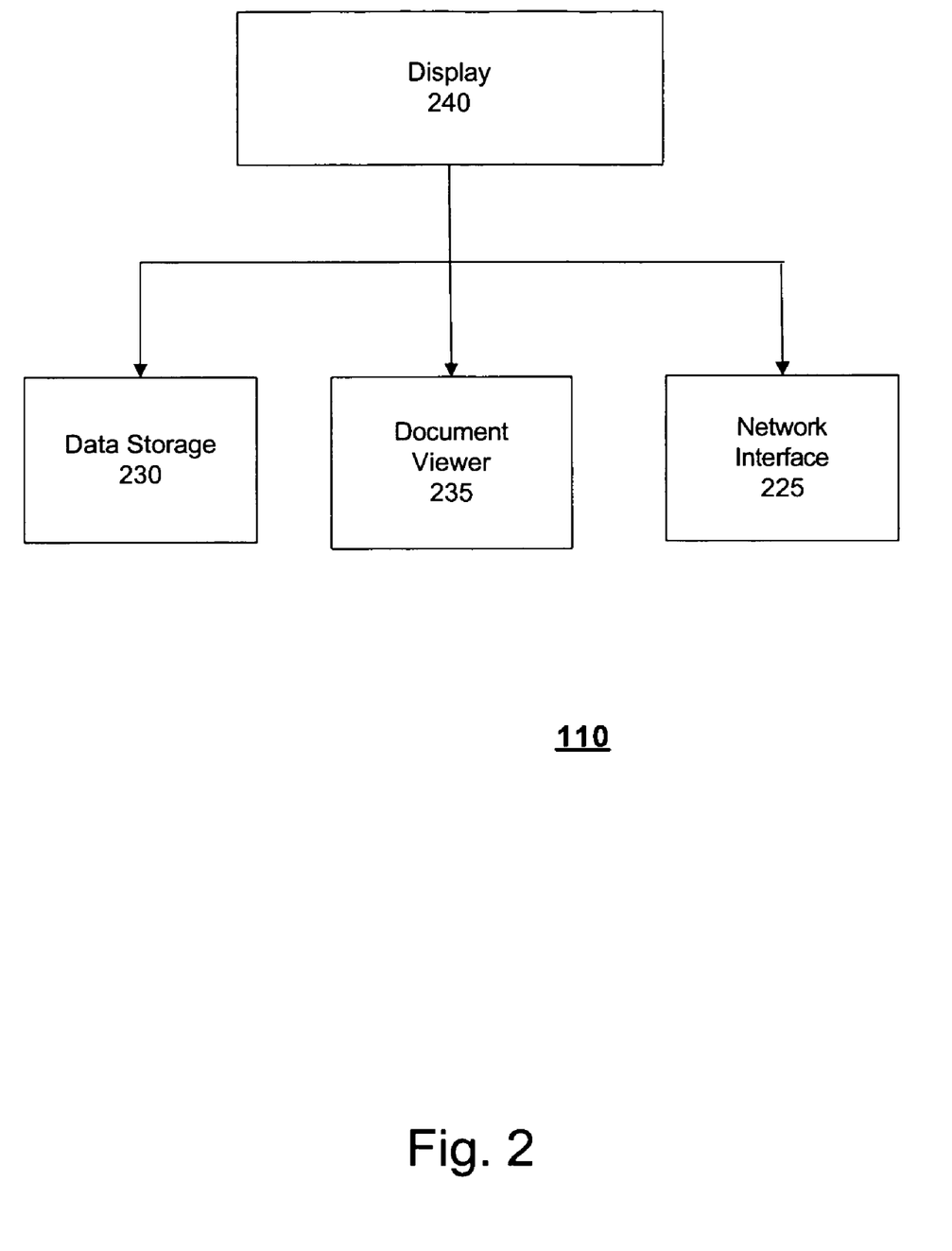
FIG. 2 is a closer view of a client system in accordance with one embodiment of the present invention.

FIG. 2 is a closer view of a client system 110 in accordance with one embodiment of the present invention. The client system 110 includes data storage 230, a document viewer 235, and a network interface 225. The data storage 230 stores documents and other necessary data locally on the client system 110. The data storage can be a solid state device such as a hard drive. Alternately the data storage can be Static Random Access Memory (SRAM) or Dynamic Random Access Memory (DRAM).

The network interface 225 manages communication between the client device 110 and remote systems. The network interface 225 includes hardware communication devices such as a modem, Ethernet, or WiFi communicator as well as software protocols for managing communication.

The document viewer 235 parses documents received via the network interface 225 and presents them upon the display 240. The document viewer 235 preferably includes the ability to interpret HTML as well as most conventional document formats (Microsoft Word, Microsoft Excel, etc.) In one embodiment, the document viewer 235 is an application selector routine, that upon receiving a file across the network interface 225, determines a preferred application for viewing the file type and submits the file to the appropriate application, which then displays the document on the display 240. The document viewer can be a standardized application such as a web browser or an application specially configured for use with the access server 125. In an alternate embodiment, the document viewer 235 is a single application capable of displaying multiple file formats which independently receives and displays any received documents. In some embodiments, the document viewer 235 includes functionality for editing any received documents and either storing them in the data storage 240 or transmitting them back to the access server 125.

In some embodiments, the client system 110 is not configured to actually view files maintained by the access server 125. For example, if the client system 110 were a cell phone without significant display functionality, the client system could copy the files to remote locations, direct the access server to print them at remote printers, and perform other functions, but not actually view the files themselves.

In some embodiments, the access server 125 or the client itself provides filters to recently used file lists according to the capacities or primary uses of the client 110. For example, if the client 110 were used primarily to generate video presentations, the file source wrapper would generate a list of the most recently used video presentation. Alternately, if the client couldn't view Microsoft Word documents or files larger than a predetermined size, the access server 125 or client itself 110 could filter larger files or Microsoft Word documents.

Figure 3:
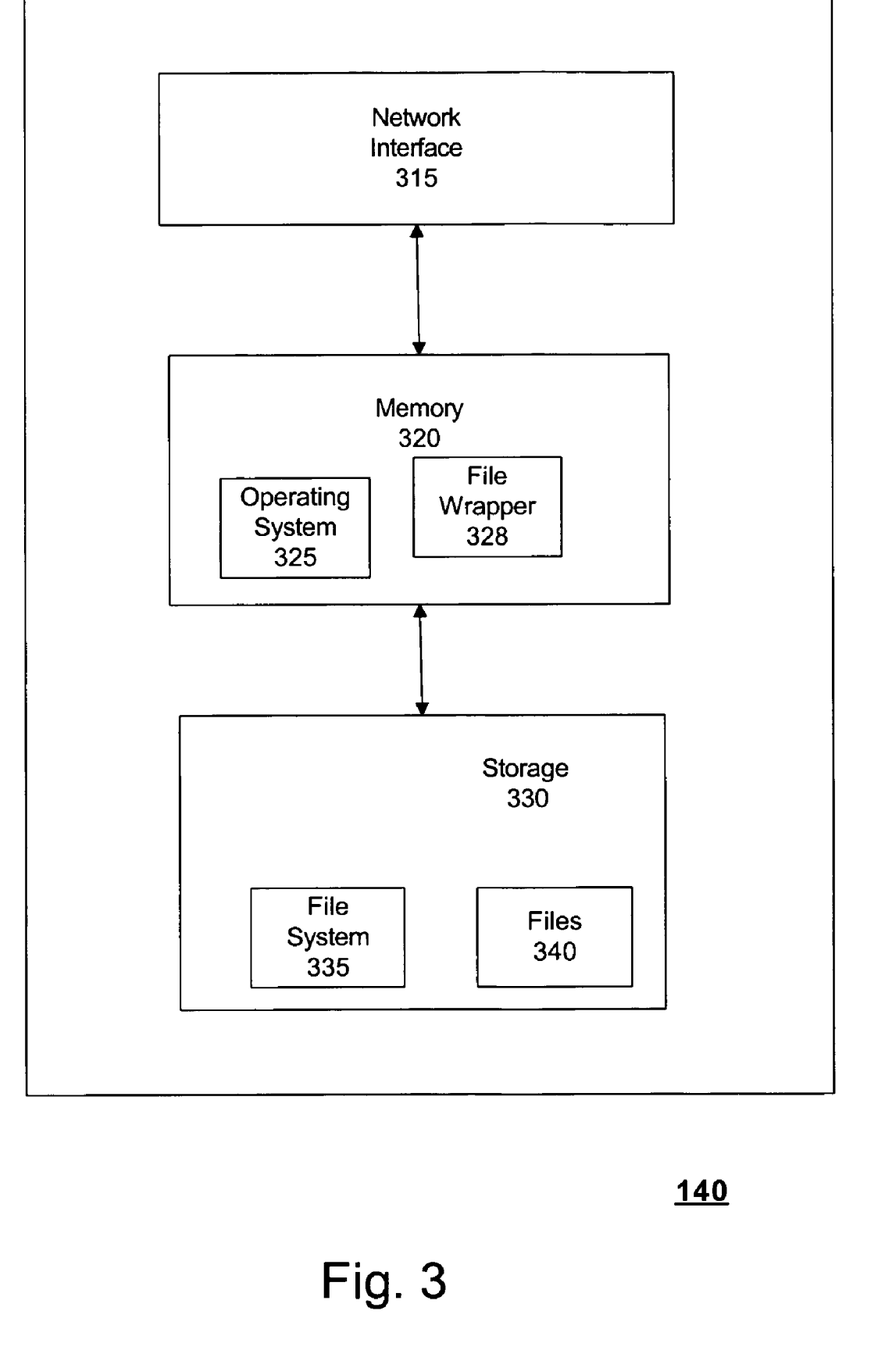
FIG. 3 is a closer view of a file source in accordance with one embodiment of the present invention.

FIG. 3 is a closer view of a file source 140 in accordance with one embodiment of the present invention. The file source preferably includes a network interface 315, a memory 320, and a storage 330. The file source can be a personal computer, a file server, or a public use computer.

The network interface 315 maintains communication between the file source 140 and any devices attempting to access the storage 330. The network interface can be an Ethernet connection, modem, WiFi transmitter, or any hardware capable of communicating with outside devices.

The memory 320 stores data in temporary use and maintains the operating system 325 which regulates access between the storage 330 and the network interface 315. The operating system 325 can include user identifiers and passwords which are used to regulate access to the storage 330. In one embodiment, the operating system 325 maintains an account for at least one user and restricts access to certain sections of the storage 330 to that user.

The storage 330 includes a file system 335 which maintains organizational information for the files 340 stored on the storage 330. The file system 335 maintains a directory structure, a time of last use for each of the files 340, access permissions for each of the directories 340, and all other information needed to properly manage access to the files 340 by the operating system 325.

The storage also includes a list of recently accessed files 345, which is maintained by the operating system 345. In one embodiment, the recent files 345 are a list of the files most recently accessed, modified, or created, by the operating system 325. In an alternate embodiment, the operating system 325 maintains a separate recent file list 345 for each application which is run upon the system. For example, the operating system could maintain a list of the files most recently used by Microsoft Word, a separate list of the files last used by Adobe Acrobat, and a third list of the files last used by the Windows Media Player. The number and details of the lists 345 are governed by the complexity of the operating system 325.

In one embodiment, the file source 140 includes a file source wrapper 328. The file source wrapper 328 is a module which is configured to manage interaction with the access server 125. The file source wrapper 328 periodically gathers lists of recently used files to present to the access server 125 when it contacts the file source. The file source wrapper may draw the list from the operating system 325 or check lists maintained by different applications on the file source 325 and unify them to a single file list. In some embodiments, a single file wrapper 328 acts as a gateway for a number of file sources behind a firewall.

In additional embodiments, the file source does not include a file source wrapper 328 and the access server 125 logs in and interacts with the file source through a traditional client server process maintained by the operating system 325.

Figure 4:
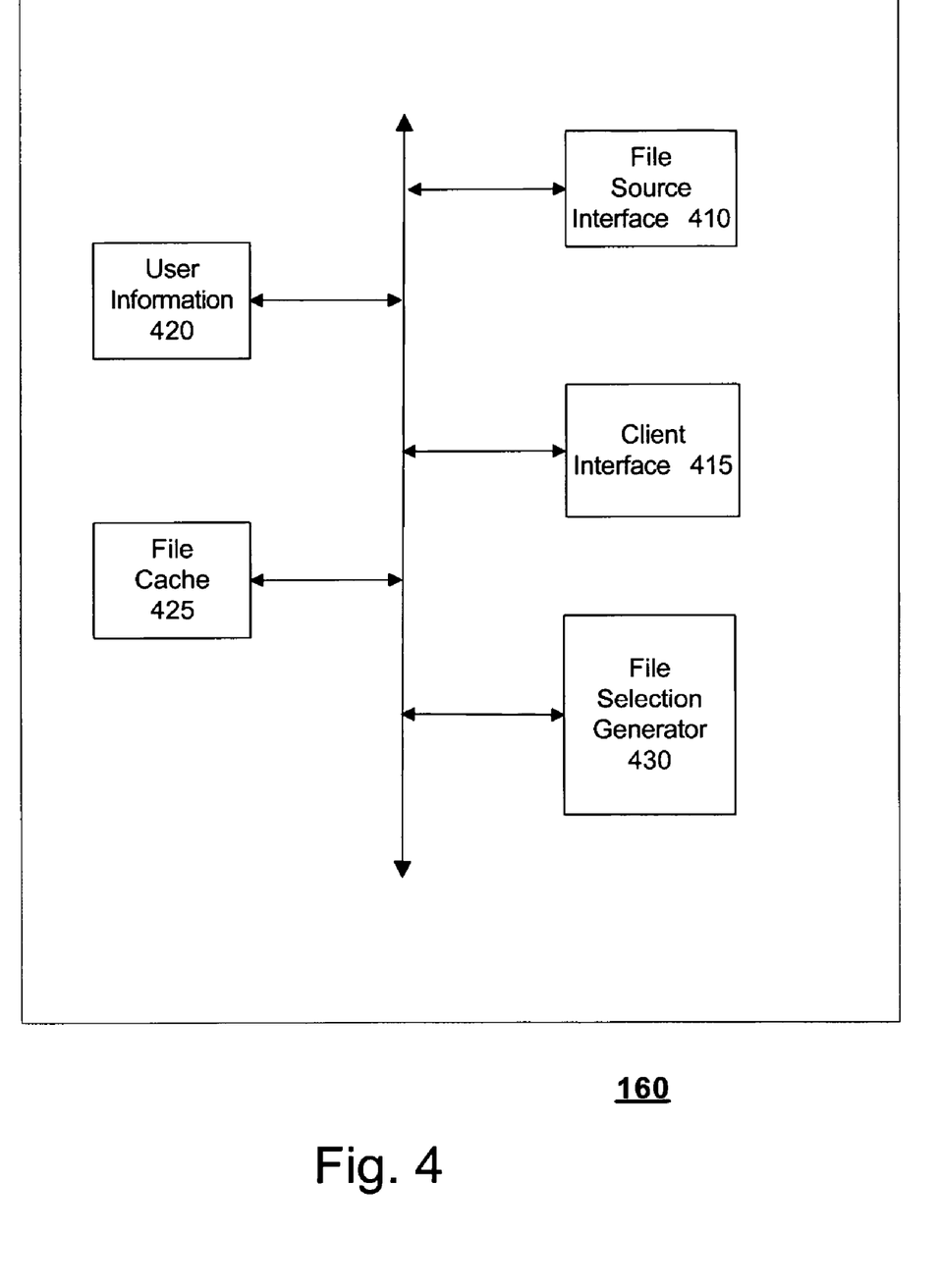
FIG. 4 is a closer view of a memory of an access server in accordance with one embodiment of the present invention.

FIG. 4 is a closer view of the memory 160 of an access server 125 in accordance with one embodiment of the present invention. The memory 160 includes a number of modules, specifically, a file source interface 410, a client interface 415, user information 420, a file cache, 425, and a file selection generator 430, each of which provides some functionality for the access server 125. The modules 410, 415, 420, 425 can be hardware, software, firmware, or any combination thereof.

The user information 420 stores customized user information for each of a number of users of the access server. The user information 420 stores a list of sources for each user, a list of usernames and passwords for each source, and a list of recent files associated with each source.

The file source interface 410 manages interaction between the access server 125 and the file sources 140, 145, and 150. The file source interface 410 can include a standardized API that interfaces with the file source wrappers 328 on the file sources through a single standardized API provided by each of the file source wrappers, or customized front ends that are configured to interface with the file sources. The file source interface 410 is configured to receive general access instructions from the other modules and translate them to the format of the file source 140, 145, 150. For example, upon receiving a request for a file owned by user A and located on a Linux server, the file source interface would log into the Linux server, submit user A's ID and password information, log into the Linux server, navigate to the correct directory, and retrieve the file to the access server 125. Alternately, it could send the request to the file source wrapper located on the file source, which would itself locate the file and transmit it.

The client interface 415 generates a customized interface for the client system 110. This interface preferably includes a listing of recently used files, and the ability to view and edit the files, either through capacities internal to the interface or by utilizing file viewers on the client system 110 itself. The client interface 415 receives commands from the client, translates them and passes them to the appropriate module. In one embodiment, the interface generated by the client interface 415 is a standard HTML interface. In an alternate embodiment, the client interface, upon initially being contacted by the client system, 110, determines its identity and capacities, and selects the interface best suited for the client system. For example, if the client system 110 were a cell phone, the client interface would generate a low bandwidth interface. In some embodiments, the access server 125 provides a standardized API for interacting with the file list and files, and the client 110 is responsible for generating an interface based on information returned from the access server 125.

The file cache 425 stores locally available versions of files that are accessed by the access server 425. When a file is first accessed, the file source interface 410 retrieves the file from the file source 140. Any changes are stored in the local file cache 425. When a user attempts to view a file, the file is transferred from the file source 140 to the file cache. In one embodiment, when a session closes, the access server 125 evaluates the cache 425 to determine if any files have been changed. Any changed files are transferred back to the file source 140. In an alternate embodiment, changed files are continuously updated on the file source 140. For example, if one of the file sources was a laptop or another intermittently connected source, the access server would check all cached files to determine whether any had changed since the last connection, and update them on the file source 140.

The file selection generator 430 contacts each of the file sources 140, 145, 150 in order to generate a list of recently used files for each user. The recently used files may comprise lists of recently accessed, recently modified, or recently created files. In one embodiment, the file selection generator 430, through the file source interface 410, contacts each of the sources to receive lists of the most recently used files 345. The file selection generator 430 can draw a single list of the most recently created, modified, or accessed files. Alternatively, the file selection generator 410 can extract a separate list of the most recently used files for each of a number of commonly used applications. For file sources that have file source wrappers, the file source wrapper generates the list and provides the list to the access server.

Some file sources 140 do not maintain separate lists of commonly used files. For these file sources, the file selection generator 430 checks the file system 335 of the file source 140 to determine which files were last accessed. Alternatively, the file selection generator can query the file source to determine which files were last modified or created. In some embodiments, the work of gathering and generating lists of recently used files is performed by the file source wrapper 328 which resides on the file source.

The number and type of files that are selected and received as recently used files can be universal, or configured separately by each user.

Figure 5:
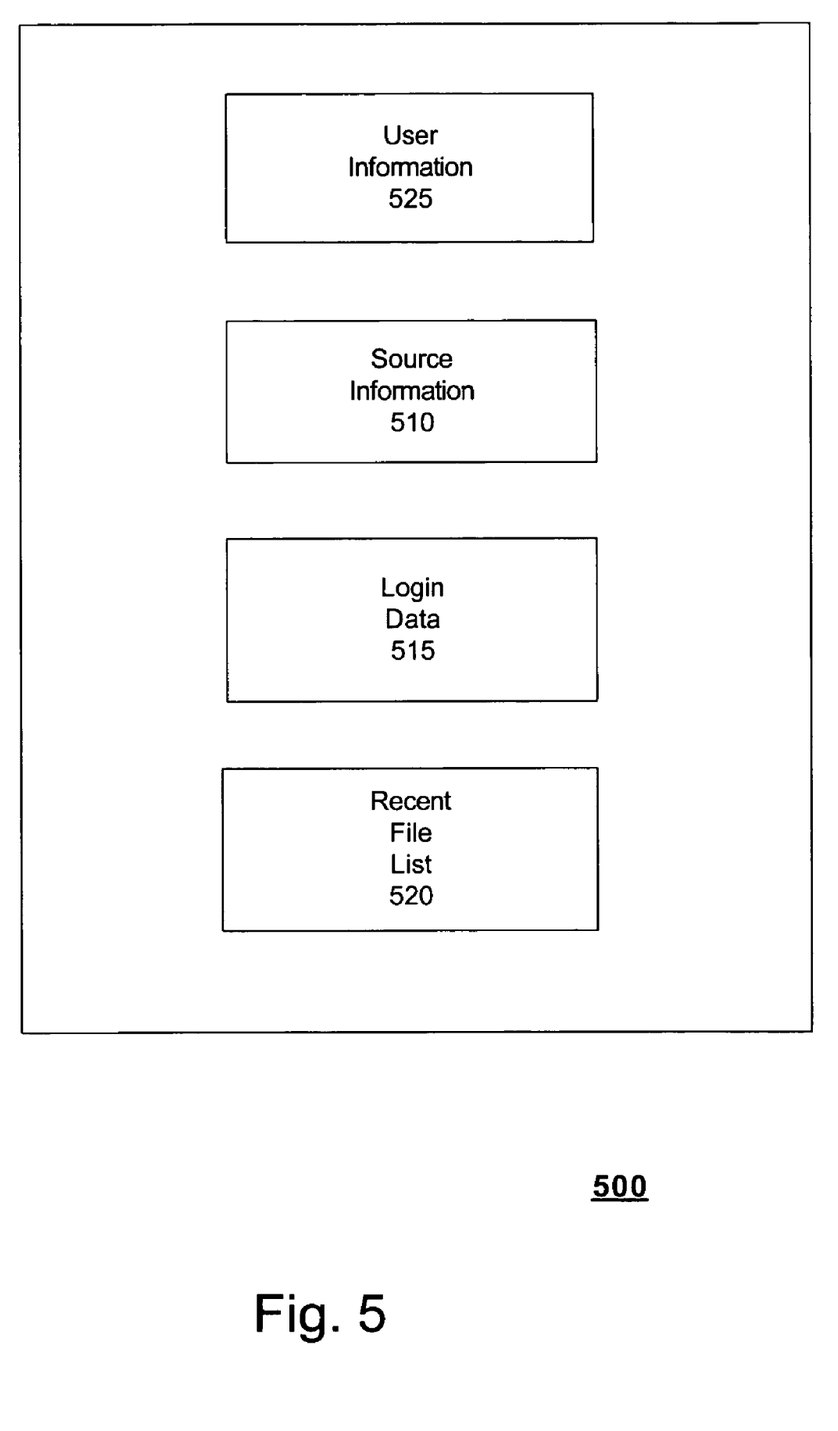
FIG. 5 is a closer view of a user file record in accordance with one embodiment of the present invention.

FIG. 5 is a closer view of a user file record 500 stored in accordance with one embodiment of the present invention. The file record 500 is usually stored in the user information 420. Typically, the user information 420 includes multiple records, each record associated with a user.

The user record 500 includes user identification 525. The user identification 525 includes information used to identify the user. Upon receiving a successful login from a user, the access server 125 searches the user identification 525 sections of each user record 500 until it finds a user ID corresponding with the submitted login information.

The source information 510 stores an identifier for each of the file sources 140, 145, 150. The identifier can include the Internet Protocol (IP) address, hostname, or any other usable identifier. This information is used to make contact with the file sources 140, 145, 150. Additionally, the source information 510 stores the operating system and computer type for the file sources 140, 145, 150. This information is utilized by the file source interface 410 to determine how to access and navigate the file sources 140, 145, 150.

The login data 515 stores usernames and passwords for each of the file sources 140, 145, 150 listed in the source information 510. The file source interface uses this information to access the file sources 140, 145, 150. In some emdodiments, the access server 125 does not maintain usernames and passwords for all file sources and instead prompts the user for credentials when accessing the file source 140.

The recent file list 520 is a list of the files most recently accessed by the user. The recent file list is periodically updated by the file selection generator 430. In one embodiment, the recent file list 520 is updated whenever the user logs into the access server 125.

Figure 6:
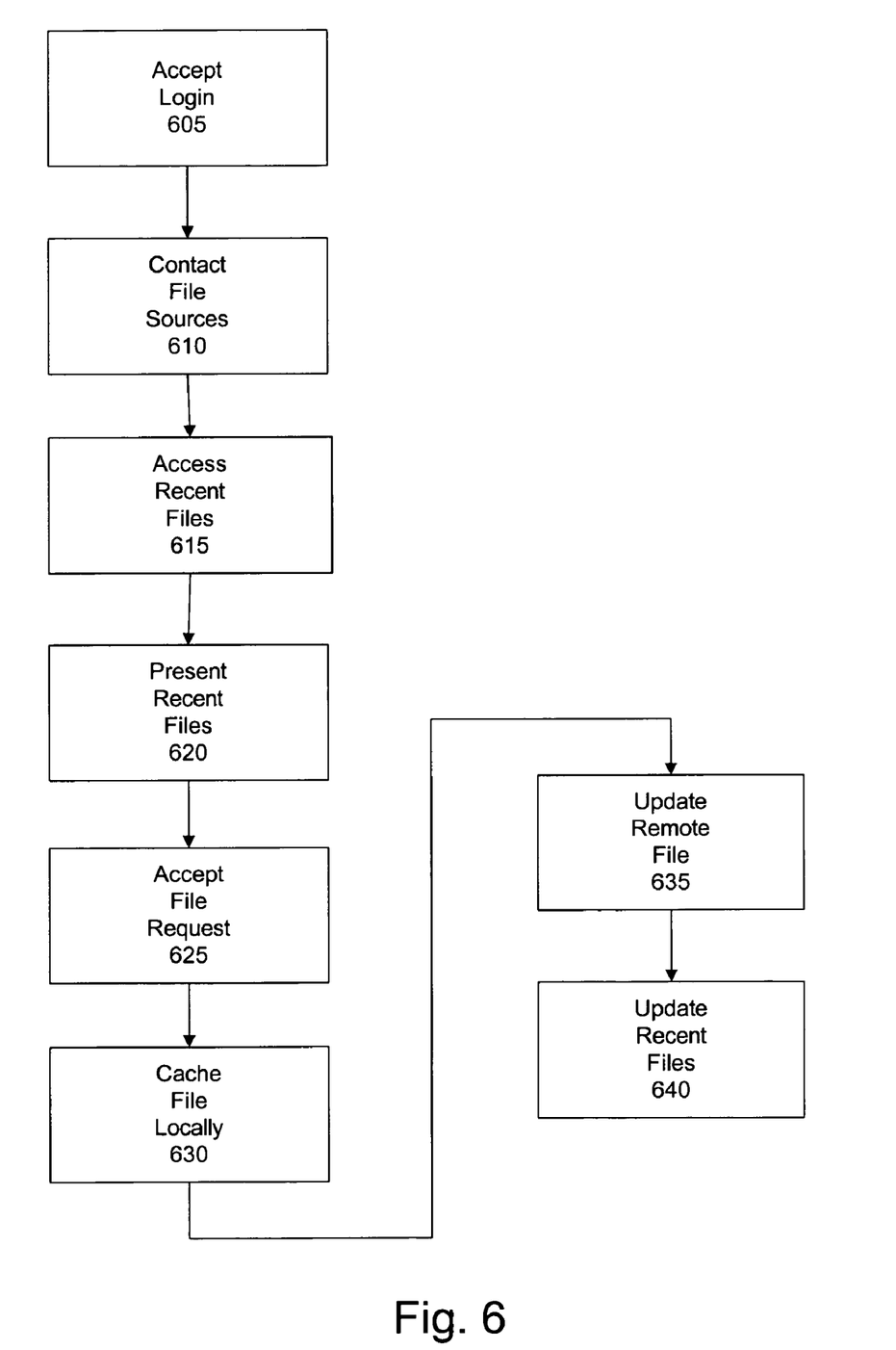
FIG. 6 is a flow chart illustrating one embodiment of a method for retrieving and editing a file stored on a remote file source.

FIG. 6 is a flow chart illustrating one embodiment of a method for retrieving and editing a file stored on a remote file source 140. It should be noted that the functions performed in this figure can be shifted between the client 110, access sever 125, or file sources 140, 145, 150. For example, the file sources may include a file source wrapper which gathers information about files stored on the file source and passes it to the access server. Alternately, the clients may perform filtering operations on recent file lists passed from the access server. The process begins with the access server accepting 605 a user login via the client interface 415. Upon receiving the user login, the access server 125 searches the user identification 525 sections of each user record 500 until it finds a user ID corresponding with the submitted login information.

The access server 125 then reads the source information 510 and contacts 610 each of the sources 140, 145, 150. If the user record 500 includes the login and password information for each of the sources, the access server extracts it. For any sources for which the login information is not present, the access server 125 prompts the user to provide username and password information. The file source interlace 410 uses the source information 510 to manage its interaction with the file sources 140, 145, 160. The file selection generator 430 then accesses 615 the recent files from each of the sources. In one embodiment, the file selection generator 430, through the file source interface 410 contacts each of the sources to receive lists of the most recently used files 345. The fire selection generator 430 can draw a single list of the most recently accessed files. Alternatively, the file selection generator 410 can extract a separate list of the most recently used files for each of a number of commonly used applications. The file selection generator 430 is configured to check the client interface for a list of applications accessible by the user and present recently used files for each of those applications. For operating systems that lack recent file histories, the file selection generator 430 sorts all of the files accessible to the user and accepts those having the latest access date as the most recent files. For those sources 140 that maintain file source wrappers 328, the file selection generator contacts the file source wrapper 328 and obtains the recent file information. The file source wrapper, access server, or client may filter the files according to the viewing capacities of the clients or other criteria. This filtering can include filtering by file type, file size, by time accessed, or any other relevant criteria.

The client interface 415 then presents 620 the user with links to the most recently accessed files. In one embodiment, the client interface provides a list of recently accessed files as part of a startup screen without additional prompting or requests. As used herein the term "link" refers to a graphical icon or text grouping that when selected via the user interface causes a document or folder to be accessed. In one embodiment, the client interface 415 also provides navigational links for accessing folders and drives on the file sources 140, 145, 150.

A user then selects a file through the client interface 415, which receives 625 the file request and retrieves the file from the file source 140. The access server 125 then caches the file locally 630 in the file cache 425 so that it can be edited. The client system 110 may also cache a copy of the file locally. Once the file has been updated and the user submits a command to save the file, the cached file is copied 635 to the file source 140, which then updates the file in the remote directory.

The file selection generator 430 then updates 640 the recent file list 520 of the user to indicate that the accessed file is a recently used file. If the file was originally selected from the recent file list 520, the file selection generator 430 places the file at a higher level of recency. If the file was not originally on the recent file list 520, it is added to the list as the most recently used file.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for providing access to remotely stored files, the method comprising:

receiving an identifier from a user to an access server;

determining, by said access server, a plurality of login data associated with the user based on the identifier received, wherein each login data provides access to at least one of a plurality of file sources, said login data being stored on the access server;

contacting by the access server each of said plurality of file sources, one or more of said plurality of file sources having a file source wrapper module residing thereon, wherein the file source wrapper module periodically gathers lists of recently used files to present to the access server upon contacting the file source by the access server; and logging into each of said plurality of file sources by the file source wrapper module via the login data associated with each file source;

automatically retrieving, from each of said plurality of file sources, information associated with at least one file recently accessed by the user and generating a single unified list of recently accessed files from all of the plurality of file sources wherein the unified list of recently accessed files is based on the user's previous activities collected across the plurality of file sources; and generating an optimized interface containing said unified list of recently accessed files automatically retrieved from the plurality of file sources and presenting said optimized interface to the user.

2. The method of claim 1, further comprising presenting the user with an option of printing a file in the unified list.

3. The method of claim 1, wherein said at least one login data includes user names and passwords for each of the plurality of file sources.

4. The method of claim 1, wherein generating the list of recently accessed files comprises receiving a list of at least one recently modified or recently created file from the file source.

5. The method of claim 1, wherein generating the list of recently accessed files comprises:

reading a time of last access for files stored on the file source; and selecting a file according to its time of last access.

6. The method of claim 1, wherein generating the unified list of recently accessed files comprises:

determining an application available to the user; and receiving from the file source a list of at least one file associated with the application.

7. The method of claim 1, further comprising:

receiving changes to a copy of a file in the unified list; and transmitting the copy of the file to the file source.

8. A system for providing access to remotely stored files, the system comprising:
- a client interface configured to receive an identifier from a user to an access server wherein said access server determines a plurality of login data associated with the user based on the identifier, each login data used for accessing at least one of a plurality of file sources, one or more of said plurality of file sources having a file source wrapper module residing thereon, wherein the file source wrapper module gathers lists of recently used files to present to the access server upon contacting the file source by the access server; and
- a file selection generator configured to:
  - contact each of the plurality of file sources associated with the login data and request the file source wrapper to log into each of the plurality of file sources using said login data; and
  - retrieve information associated with files recently accessed by the user from each of the plurality of file sources; and
  - generate a single unified list of recently accessed files from all of the plurality of file sources wherein the unified list of recently accessed files is based on the user's previous activities collected across the plurality of file sources on multiple networks.

9. The system of claim 8, wherein the client interface is further configured to present the user with an option to view a file in the unified list.

10. The system of claim 9, wherein the list of recently accessed files comprises a list of most recently created files.

11. The system of claim 9, wherein generating the list of recently accessed files comprises generating a customized interface for the client.

12. The system of claim 9, wherein generating the list of recently accessed files comprises:
- reading a time of last access for files stored on the file source; and
- selecting a file according to its time of last access.

13. The system of claim 8, wherein generating the list of recently accessed files comprises:
- determining an application available to the user; and
- receiving from the file source a list of at least one file associated with the application.

14. The system of claim 8, wherein the client interface is configured to receive changes to a copy of a file in the unified list, wherein said changes are then propagated to an appropriate file source in the plurality of file sources.

15. A computer program product, stored on a computer readable medium, and including computer executable instructions for controlling a processor to provide access to remotely stored files, the instructions comprising:
- receiving an identifier from a user to an access server;
- determining, by said access server, a plurality of login data associated with the user based on the identifier received, wherein each login data provides access to at least one of a plurality of file sources, said login data being stored on the access server;
- contacting by the access server each of said plurality of file sources, one or more of said plurality of file sources having a file source wrapper module residing thereon, wherein the file source wrapper module periodically gathers lists of recently used files to present to the access server upon contacting the file source by the access server; and
- logging into each of said plurality of file sources by the file source wrapper via the login data associated with the file source;
- automatically retrieving, from each of said plurality of file sources, information associated with at least one file recently accessed by the user and generating a single unified list of recently accessed files from all of the plurality of file sources wherein the unified list of recently accessed files is based on the user's previous activities collected across the plurality of file sources; and
- generating an optimized interface containing said unified list of recently accessed files automatically retrieved from the plurality of file sources and presenting said optimized interface to the user.

16. The computer program product of claim 15, wherein the computer code instructions further comprise providing the user with an option of transferring a file in the unified list to a system of the user or to another location.

17. The computer program product of claim 15, wherein the list of recently accessed files comprises a list of most recently modified files.

18. The computer program product of claim 15, wherein generating the list of recently accessed files comprises receiving a list of at least one recently modified or recently created file from the file source.

19. The computer program product of claim 15, wherein generating the list of recently accessed files comprises:
- reading a time of last access for files stored on the file source; and
- selecting a file according to its time of last access.

20. The computer program product of claim 15, wherein generating the list of recently accessed files comprises:
- determining an application available to the user; and
- receiving from the file source a list of at least one file associated with the application.

21. The computer program product of claim 15, wherein the instructions further comprise:
- receiving changes to a copy of the a file in the unified list; and
- transmitting the copy of the file to the file source.

22. A system for providing access to files, the system comprising:
- a plurality of file servers storing files and a list of at least one recently accessed file, one or more of said plurality of file servers having a file source wrapper module residing thereon, wherein the file source wrapper module periodically gathers lists of recently used files; and
- an access server configured to:
  - receive an identifier from a user;
  - determine a plurality of login data associated with the user based on the identifier received, wherein each login data provides access to at least one of said plurality of file servers, said login data being stored on the access server;
  - contact each of the plurality of file servers in response to receiving the identifier and automatically log into each of the plurality of file servers by using said login data; and
  - retrieve the list recently accessed files from the plurality of file servers wherein the list of recently accessed files is based on the user's previous activities collected across the plurality of file sources.

23. The system of claim 22, wherein the access server is further configured to retrieve a file in the unified list from the file server upon receiving a request from the user.

24. The system of claim 22, wherein the access server is further configured to provide the user with an option of emailing a file in the unified list to another location.

25. The system of claim 22, wherein the file server stores a list of at least one recently used file associated with an application.

26. A method for enabling a user to access and manage files from a plurality of file sources, the method comprising:
- receiving an identifier from the user to an access server;
- determining, by said access server, a plurality of login data associated with the user based on the identifier received, wherein each login data provides access to at least one of a plurality of file sources, one or more of said plurality of file sources having a file source wrapper module residing thereon, wherein the file source wrapper module periodically gathers lists of recently used files to present to the access server upon contacting the file source by the access server;
- contacting at least two file sources by the access server and logging into each file source by the file source wrapper module via the login data associated with each file source;
- retrieving, from each of said two file sources, information associated with at least one file recently accessed by the user; and
- generating a unified list of recently accessed files from the at least two file sources wherein the unified list of recently accessed files is based on the user's previous activities collected across the plurality of file sources.

27. The method of claim 26, further comprising presenting the user with an option of faxing a file in the unified list.

28. The method of claim 26, further comprising generating a customized interface containing the unified list of recently accessed files.

29. The method of claim 26, wherein generating the unified list comprises receiving a list of recently used files from a file source.

30. The method of claim 26, wherein generating the unified list comprises:
- determining an application available to the user; and
- receiving from a file source a list of at least one file associated with the application.

31. The method of claim 26, further comprising presenting to the user a startup screen which includes a visual display representing the list of recently accessed files.

32. A computer program product, stored on a computer readable medium, and including computer executable instructions for controlling a processor to provide access to enable a user to access and manage files from a plurality of file sources, the instructions comprising:
- receiving an identifier from the user to an access server;
- determining, by said access server, a plurality of login data associated with the user based on the identifier received, wherein each login data provides access to at least one of a plurality of file sources, one or more of said plurality of file sources having a file source wrapper module residing thereon, wherein the file source wrapper module periodically gathers lists of recently used files to present to the access server upon contacting the file source by the access server;
- contacting at least two file sources by the access server and logging into each file source by the file source wrapper module via the login data associated with each file source;
- retrieving, from each of said two file sources, information associated with at least one file recently accessed by the user; and
- generating a unified list of recently accessed files from the at least two file sources wherein the unified list of recently accessed files is based on the user's previous activities collected across the plurality of file sources.

33. The computer program product of claim 32, wherein the computer code instructions further comprise providing the user with an option of viewing a file in the unified list.

34. The computer program product of claim 33, wherein the computer code instructions further comprise generating a customized interface containing the unified list of recently accessed files.

35. The computer program product of claim 32, wherein generating the unified list of recently accessed files comprises:
- determining an application available to the user; and
- receiving from the file source a list of at least one file associated with the application.

36. The computer program product of claim 32, wherein the instructions further comprise:
- receiving changes to a copy of a file in the unified list; and
- transmitting the copy of the file to the file source.

37. The computer program product of claim 32, wherein the instructions further comprise presenting to the user a startup screen displaying the unified list.

\* \* \* \* \*